United States Patent
Nielsen

(10) Patent No.: US 11,231,016 B2
(45) Date of Patent: Jan. 25, 2022

(54) METHOD AND ARRANGEMENT FOR CONTINUOUS CALIBRATION OF A WIND DIRECTION MEASUREMENT

(71) Applicant: Siemens Gamesa Renewable Energy A/S, Brande (DK)

(72) Inventor: Torben Nielsen, Sporup (DK)

(73) Assignee: SIEMENS GAMESA RENEWABLE ENERGY A/S

(*) Notice: Subject to any disclaimer, the term of this patent is extended or adjusted under 35 U.S.C. 154(b) by 649 days.

(21) Appl. No.: 15/410,852

(22) Filed: Jan. 20, 2017

(65) Prior Publication Data

US 2017/0284375 A1 Oct. 5, 2017

(30) Foreign Application Priority Data

Mar. 30, 2016 (EP) .................................... 16163022

(51) Int. Cl.
*F03D 17/00* (2016.01)
*F03D 7/02* (2006.01)
(Continued)

(52) U.S. Cl.
CPC .............. *F03D 17/00* (2016.05); *F03D 7/00* (2013.01); *F03D 7/0204* (2013.01); *G01P 5/02* (2013.01);
(Continued)

(58) Field of Classification Search
CPC .......... F03D 17/00; F03D 7/0204; F03D 7/00; G01P 5/02; G01P 13/02; F05B 2270/802;
(Continued)

(56) References Cited

U.S. PATENT DOCUMENTS 5,083,039 A * 1/1992 Richardson ........... F03D 7/0272
290/44
6,249,757 B1 * 6/2001 Cason ..................... G10L 25/78
370/289
(Continued)

FOREIGN PATENT DOCUMENTS

CN 101725468 A 6/2010
CN 105298748 A 2/2016
(Continued)

OTHER PUBLICATIONS

European Search Report dated Oct. 17, 2016, Application No. 16163022.3; 6pgs.

*Primary Examiner* — David Hamaoui
(74) *Attorney, Agent, or Firm* — Schmeiser, Olsen & Watts LLP

(57) ABSTRACT

A method for calibrating a wind direction measurement for a wind turbine is provided. The method including: measuring plural samples of a relative wind direction representing a difference angle between a real wind direction and an orientation of a measurement equipment, in particular a direction orthogonal to a rotor blade plane, to obtain plural measured relative wind directions; deriving a measured relative wind direction change based on the measured relative wind directions; measuring plural samples of a performance parameter indicating a performance of the wind turbine; deriving a performance change based on the plural samples of the performance parameter; determining a correlation value between the measured relative wind direction change and the performance change; measuring further plural samples of the relative wind direction; and correcting the further measured relative wind directions based on the correlation value, to obtain corrected further measured relative wind directions.

17 Claims, 6 Drawing Sheets

(51) Int. Cl.
*F03D 7/00* (2006.01)
*G01P 5/02* (2006.01)
*G01P 13/02* (2006.01)

(52) U.S. Cl.
CPC ........ *G01P 13/02* (2013.01); *F05B 2240/221* (2013.01); *F05B 2270/321* (2013.01); *F05B 2270/802* (2013.01); *Y02E 10/72* (2013.01)

(58) Field of Classification Search
CPC ......... F05B 2240/221; F05B 2270/321; Y02E 10/723
See application file for complete search history.

(56) References Cited

U.S. PATENT DOCUMENTS

| | | | |
|---|---|---|---|
| 7,952,215 B2 * | 5/2011 | Hayashi ................ | F03D 7/0204 290/44 |
| 8,257,040 B2 * | 9/2012 | Chen ........................ | F03D 17/00 416/1 |
| 8,364,323 B2 * | 1/2013 | Arinaga .................. | F03D 7/048 700/287 |
| 10,100,813 B2 * | 10/2018 | Ravindra ................ | F03D 7/048 |
| 2013/0272877 A1 * | 10/2013 | Andersen .................. | F03D 7/02 416/1 |

FOREIGN PATENT DOCUMENTS

| | | | |
|---|---|---|---|
| EP | 2653721 | A1 | 10/2013 |
| WO | WO2012153185 | A1 | 11/2012 |

\* cited by examiner

METHOD AND ARRANGEMENT FOR CONTINUOUS CALIBRATION OF A WIND DIRECTION MEASUREMENT

CROSS-REFERENCE TO RELATED APPLICATIONS

This application claims priority European Application No. 16163022.3 having a filing date of Mar. 30, 2016, the entire contents of which are hereby incorporated by reference.

FIELD OF TECHNOLOGY

The following relates to a method and to an arrangement for calibrating and/or performing a wind direction measurement for a wind turbine.

BACKGROUND

To obtain a maximal power output of a wind turbine, it may be required to align the wind turbine such that the wind direction is parallel to the nacelle, i.e. orthogonal to a rotor plane in which the rotor blades rotate. Conventionally, wind direction measurement equipment is utilized to measure the wind direction and based on the measured wind direction the yawing system of the wind turbine is activated to properly align the wind turbine to accurately face the wind. It is very important for a wind turbine to face the wind at all times, as this results in maximum power production and minimum loads. Therefore, the wind turbine is yawed based on wind direction measurements, typically performed using equipment installed on top of the turbine nacelle. If the wind direction measurement is just slightly erroneous, it may result in a significant production loss.

It has been observed that conventional wind direction measurements not in all situations are reliable and accurate. Thus, the wind turbine is not operated in all situations for producing maximal power and experiencing minimum loads.

Thus, there may be a need for a method and arrangement for calibrating and/or performing a wind direction measurement, in particular utilized in a wind turbine, wherein the actual wind direction can reliably and accurately be determined. Further, there may be a need for a wind turbine which takes advantage of a more accurate wind direction measurement for properly aligning the wind turbine to face the wind.

SUMMARY

According to an embodiment of the present invention it is provided a method for calibrating and/or performing a wind direction measurement for a wind turbine, the method comprising: measuring plural samples of a relative wind direction representing a difference angle between a real wind direction and an orientation of a measurement equipment, in particular a direction orthogonal to a rotor blade plane, to obtain plural measured relative wind directions, deriving a measured relative wind direction change based on the measured relative wind directions, measuring plural samples of a performance parameter (each sample being associated with, in particular being related to the same time point as, a corresponding sample of the measured relative wind direction) indicating a performance of the wind turbine; deriving a performance change based on the plural samples of the performance parameter, determining a correlation value between the measured relative wind direction change and the performance change, measuring further plural samples of the relative wind direction; and correcting the further measured relative wind directions based on the correlation value, to obtain corrected further measured relative wind directions.

The correlation value may by understood in a broad sense to characterize any of a broad class of statistical relationships involving dependence. In some embodiments the correlation value may be or may be related to or derived from a particular correlation coefficient, measuring the degree of correlation. Examples of correlation coefficients are the Pearson correlation coefficient, Rank correlation coefficients, such as Spearman's rank correlation coefficient and Kendall's rank correlation coefficient.

The method can be performed by an arrangement for calibrating a wind direction measurement which may be situated within or associated with the wind turbine, such as in a wind turbine controller. In other embodiments, the method may be performed offline, e.g. by processing historical data.

The plural samples of the relative wind direction may represent measurements at different, successive time points. The measuring of the plural samples of the relative wind direction as well as the measuring of the plural samples of the performance parameter may be performed continuously without interrupting the normal operation of the wind turbine.

The measurement of the relative wind direction may be performed using a wind direction/speed measurement device, for example installed at the nacelle of the wind turbine which supports a rotor at which plural rotor blades are connected. The measurement equipment can for example be oriented to be substantially parallel to the nacelle, i.e. orthogonal to the rotor plane. Ideally, the measurement equipment should indicate an angle of 0° between the real wind direction and the orientation of the measurement equipment, when the real wind direction is orthogonal to the rotor plane. However, due to adjustment errors or disturbances of the measurement or systematic errors, the raw measurement values produced by the measurement equipment may be erroneous and may therefore not reflect the true relative wind direction. The method is therefore designed to correct or calibrate the raw measurement data, in order to obtain more accurate and reliable results regarding the relative wind direction.

The plural samples of the relative wind direction may, in other embodiments, represent one or more components of the real wind direction in a coordinate system defined by the rotor axis and a plane orthogonal to the rotor axis, which is the rotor plane. In conventional methods and systems, the plural measured relative wind directions are erroneous and thus do not represent the real relative wind directions.

The measured relative wind direction change may be derived in a number of ways, for example taking into account two or more samples of the relative wind direction at different time points. One way is to use one or more filters which have different characteristics. In particular, both the relative wind direction and the wind direction change may be derived by using filters with different characteristics. By deriving the change of the measured relative wind direction, the method does not rely on the absolute value of the measured relative wind direction, which may make the method more reliable and accurate.

The performance parameter may be defined in a number of ways. The performance parameter should reflect the performance of the wind turbine, such as regarding power production, in particular active power production. The performance parameter may for example be determined based on several measured quantities, such as several measured electrical quantities of the wind turbine.

The performance change may be derived in a number of ways, for example utilizing one or more filters that have different characteristics. In particular, both the performance and the performance change may be derived by using filters with different characteristics.

The correlation value may be determined in a number of ways, involving determination of a degree of a mutual dependence of the measured relative wind direction change and the performance change. The correlation value may indicate whether the performance change is positive if the measured relative wind direction change is positive or negative or may indicate whether the performance change is negative if the measured relative wind direction change is positive or negative. Determining the correlation value (as defined above in a broad sense and in a more restricted sense) may indicate whether increase or decrease of the measured relative wind direction change would result in an increase or a decrease of the performance change. Thus, the correlation value may indicate in which direction the measured relative wind direction should be modified, in order to obtain the real relative wind direction. Therefore, the correlation value is used, to modify or correct the further measured relative wind directions to obtain the corrected further measured relative wind directions which should be closer to the real relative wind directions than before correction.

According to this embodiment, a calibration of the wind direction measurement is thus formed based on the correlation between wind direction changes and changes in some performance parameter. If some changes in the wind direction result in an increase in the performance, then it can be assumed that the correct wind direction is in the opposite direction of the change, and the wind direction measurement is modified accordingly.

According to an embodiment of the present invention, the method is continuously, iteratively performed, in particular during normal operation. Thus, the method may advantageously be applied and performed without interrupting energy production by the wind turbine. Further, the normal control systems are not required to be modified. The method may only lead to a more accurate measurement of the relative wind direction. Of course, the more accurate and more reliable measurement of the relative wind direction may be supplied for example to a yawing system, thus indirectly influencing the control and/or operation of the wind turbine.

According to an embodiment of the present invention, the method is performed irrespective whether the wind direction and/or wind speed and/or yaw position changes or not. Thus, no particular environmental conditions or a particular measurement setup is required for performing the method. Thus, the method may be performed under arbitrary conditions.

According to an embodiment of the present invention, the performance parameter is or comprises at least one of the following: an effective wind speed, representing a measure of the wind speed experienced by the wind turbine effective for energy production, in particular representing a component of the wind speed in a direction orthogonal to a rotor blade plane, a power, in particular active power, produced by the wind turbine, in particular applied in low and medium wind ranges; a pitch angle, in particular applied at high wind speed; an increase in rotor speed; or a load indicating quantity. The performance parameter could also be or comprise other quantities.

The performance of the wind turbine may be estimated or measured in many different ways. At low and medium wind speeds (for example at wind speeds below 15 m/s), the produced power, in particular produced active power, may be used as a performance measure, but also an increase in the rotor speed could indicate an increased performance. In high wind speed ranges, such as wind speeds above 15 m/s, the pitch angle may be a reasonable performance parameter, as the optimal nacelle position would result in maximum wind inflow and a greater pitch angle. Combinations of the produced power, in particular produced active power, increase of rotor speed and/or pitch angles are possible as suitable performance parameters. The effective wind speed may generally be the best suitable performance parameter, wherein the effective wind speed may be equal to the wind speed component parallel to the nacelle, i.e. orthogonal to the rotor plane. The effective wind speed may provide a consistent and appropriate measure of the wind turbine performance at all wind speeds, i.e. a low, medium and high wind speed range. The effective wind speed may for example be estimated or calculated from an advanced turbine model, utilizing the actual power production, the actual rotor speed and the actual pitch angle. This may be possible, as all possible combinations of wind speed, rotor speed and pitch angle may result in a theoretical power output and thus the effective wind speed may be estimated, if the actual operational values are known. Thereby, the power, the pitch angle and the increase of rotor speed may be conventionally available measurement values. Thus, the method may be applied without requiring additional measurement devices or measurement sensors.

According to an embodiment of the present invention, the effective wind speed is estimated using a turbine model, taking into account actual power produced, actual rotor speed, and/or actual pitch angle. The turbine model may be a physical/mathematical model simulating the operation of the wind turbine and thereby relating mechanical and electrical parameters to each other. Thus, the method may be implemented in a simple manner.

The effective wind speed may for example be calculated using a look-up table having columns of the pitch angle, the rotational speed and the power, thus expressing the effective wind speed as a function of the pitch angle, the rotational speed and the power. The effective wind speed may be calculated as a function of alternative or additional electrical or mechanical quantities of the wind turbine.

According to an embodiment of the present invention, the deriving of the measured wind direction change comprises: passing the plural measured samples of a wind direction through two low pass filters with different time constants and forming the difference of outputs of two low pass filters. The wind direction change may be defined as the output of the low pass filter with the lowest time constant minus the output from the low pass filter with the highest time constant. Thereby, the method may be implemented using conventionally available filters or any other filter type with which a time constant can be related. Other ways of deriving the changes are possible, e.g. involving binning of obtained measurements.

According to an embodiment of the present invention, the deriving the performance change comprises: passing the plural measured samples of performance parameter through a fast low pass filter and a slow low pass filter and forming the difference of outputs of the fast and slow low pass filters. In particular a similar or even same procedure as used for processing the wind direction data could by applied.

According to an embodiment of the present invention, the determining the correlation value between measured relative wind direction change and the performance change comprises multiplying the measured relative wind direction change and the performance change. Thereby, the method may be easily implemented. In other embodiments, these signals may be combined in any way that would yield a value related to the correlation.

According to an embodiment of the present invention, the correcting of the measured relative wind direction based on the correlation value comprises modifying the measured relative wind direction based on the correlation value such that a correlation between future modified measured relative wind direction and the future performance parameter decreases. Ideally, a correlation between the measured relative wind direction change and the performance change should be zero, when the measured relative wind direction equals the real relative wind direction and the wind turbine is yawed based on the measured relative wind direction to face the wind. Thus, when the corrected measured relative wind direction does not correlate with the performance parameter, it can be expected that the corrected measured relative wind direction reflects the real relative wind direction with higher accuracy than before the correction.

According to an embodiment of the present invention, the correcting of the measured relative wind direction based on the correlation value comprises subtracting a value proportional to the correlation value from the measured wind direction.

The correlation value may be positive or negative. For example, the correlation value is positive, if the measured relative wind direction change is positive and also the performance change is positive. The correlation value is also positive, if the measured relative wind direction change is negative and the performance change is negative. The correlation value is negative if the measured relative wind direction change has a sign which is different from the sign of the performance change. Subtracting the value proportional to the correlation value (wherein the proportionality factor is positive) may lead to corrected measured relative wind directions which more accurately correspond to or are equal to the real relative wind directions.

According to an embodiment of the present invention, the proportionality factor is selected to avoid overshooting. In particular, the proportionality factor is larger than zero but should not be selected too high, since in this case, the corrected relative wind direction may be even less accurate than the previously determined relative wind direction. The proportionality factor may be adjusted during performing the method. For example, the proportionality factor may be decreased, when overshooting is detected (such e.g. when the sign of the further correlation value changes compared to the previous correlation value) or the proportionality factor could be controlled by a PID-controller or a similar controller procedure.

According to an embodiment of the present invention, the method further comprises storing the determined correlation value in dependence/association of at least one operational and/or environmental or general (regardless of operational or environmental) parameter, in particular a wind speed. The operational parameter may for example comprise power output, rotational speed, pitch angle, operational status. The environmental parameter may for example comprise wind speed, wind direction, ambient temperature, humidity or the like. Storing the determined correlation value in dependence/association of the at least one operational and/or environmental parameter may allow to correct the measured relative wind direction also in dependence of the at least one operational and/or environmental parameter, thereby improving the accuracy of the method.

According to an embodiment of the present invention, the method further comprises determining the wind speed and subtracting a value proportional to the correlation value associated to the determined wind speed to obtain the corrected measured relative wind direction. When the wind speed is determined and the correlation value has been stored in associated of different wind speeds (experienced previously), a wind speed specific correction of the measured relative wind direction can be performed. Thereby, the accuracy of the corrected measured relative wind directions may even be improved.

According to an embodiment of the present invention, it is provided an arrangement for calibrating a wind direction measurement for a wind turbine, wherein the arrangement is adapted to receive plural measurement samples of a relative wind direction representing a difference angle between a real wind direction and an orientation of a measurement equipment, in particular a direction orthogonal to a rotor blade plane, to obtain plural measured relative wind directions; to derive a measured relative wind direction change based on the measured relative wind directions; to receive plural measured samples of a performance parameter indicating a performance of the wind turbine; to derive a performance change based on the plural samples of the performance parameter; to determine a correlation value between the measured relative wind direction change and the performance change; to receive further plural measured samples of the relative wind direction; and to correct the further measured relative wind directions based on the correlation value, to obtain corrected further measured relative wind directions.

It should be understood that features, individually or in any combination disclosed, described, explained or provided for a method for calibrating/performing a wind direction measurement for a wind turbine are also, individually or in any combination, applicable to an arrangement for calibrating/performing a wind direction measurement for a wind turbine according to an embodiment of the present invention and vice versa.

The arrangement may in particular be adapted to perform a method for calibrating and/or performing a wind direction measurement for a wind turbine according to an embodiment of the present invention.

According to an embodiment of the present invention it is provided a wind turbine, comprising a rotor having rotor blades connected thereto and rotating in a rotor blade plane, an arrangement for calibrating a wind direction measurement for the wind turbine according to the preceding claim, and a yawing system for directing the rotor blade plane operating based on measured relative wind directions calibrated by the arrangement for calibrating the wind direction measurement.

The wind turbine in particular further comprises at least one of: a three-cup anemometer, a vane anemometer, a ultrasonic anemometer, an acoustic resonance anemometer, and/or a pressure anemometer, for measuring the plural samples of the relative wind direction.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a wind turbine according to an embodiment of the present invention in a top view including an arrangement for calibrating and/or performing a wind direction measurement according to an embodiment of the present invention;

DETAILED DESCRIPTION

Figure 1:
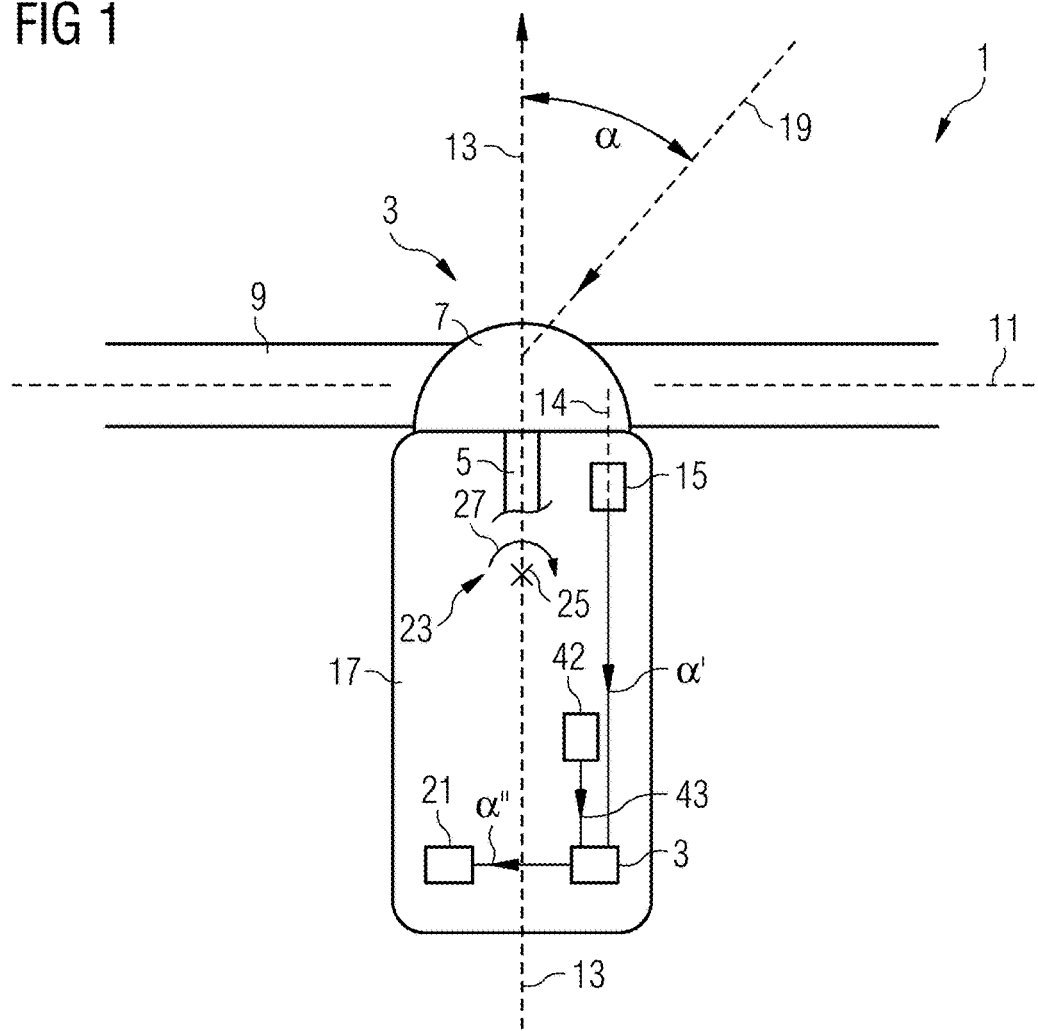

FIG. 1 illustrates, in a top view, a schematic representation of a wind turbine 1 according to an embodiment of the present invention including an arrangement 3 for calibrating and/or performing a wind direction measurement according to an embodiment of the present invention. Thereby, the arrangement 3 is adapted to perform a method for calibrating and/or performing a wind direction measurement for the wind turbine 1 according to an embodiment of the present invention.

The wind turbine 1 includes a rotor 3 including a rotor shaft 5, a rotor hub 7 and plural rotor blades 9 connected to the rotor hub 7. The rotor blades 9 rotate in a rotor blade plane 11 which is orthogonal to the rotation axis 13 of the rotor shaft 5. For measuring plural samples of the relative wind direction, the wind turbine 1 comprises an anemometer 15 which is installed at or on the nacelle 17. The nacelle 17 supports the rotor shaft 5 and further includes a not illustrated electrical generator mechanically coupled to the rotor shaft 5 and further comprises a not illustrated converter and wind turbine transformer. The nacelle direction is defined by the direction of the rotor axis 13.

The real wind direction is indicated with reference sign 19 and includes, in projection onto the surface of the earth at the location of the wind turbine 1, a difference angle α with the nacelle direction 13, i.e. the direction of the rotation axis 13. The angle α defines the relative wind direction, i.e. the direction of the wind 19 relative to the nacelle direction 13.

The anemometer 15 is provided for measuring the relative wind direction α. However, due to adjustment errors, measurement errors, or systematic errors of the anemometer 15, the anemometer measures an erroneous angle α' instead of the real relative wind direction α. The arrangement 3 is provided for calibrating/correcting the erroneous measured relative wind direction α' (and thus for performing a wind direction measurement) in order to derive a corrected measured relative wind direction α'' which should reflect to a higher accuracy the real relative wind direction α. The corrected measured relative wind direction α'' is provided to a yaw controller 21 which is adapted to control a yawing system 23 which allows to turn the rotor plane 11, in particular including the nacelle 17, around a vertical rotation axis 25, as is illustrated by the curved arrow 27, in order to direct the rotor plane 11 such as facing the wind 19, i.e. such that the rotor axis 13 aligns with the wind direction 19. In this situation, the difference angle α is 0.

According to an embodiment of the present invention, the anemometer 15 measures plural samples of a relative wind direction representing a difference angle α between a real wind direction 19 and an orientation 14 of a measurement equipment, in particular a direction 13 orthogonal to a rotor blade plane 11, to obtain plural measured relative wind directions α'. Based on the measured relative wind directions α', the arrangement 3 derives a measured relative wind direction change, as will be explained with reference to FIG. 2.

Figure 2:
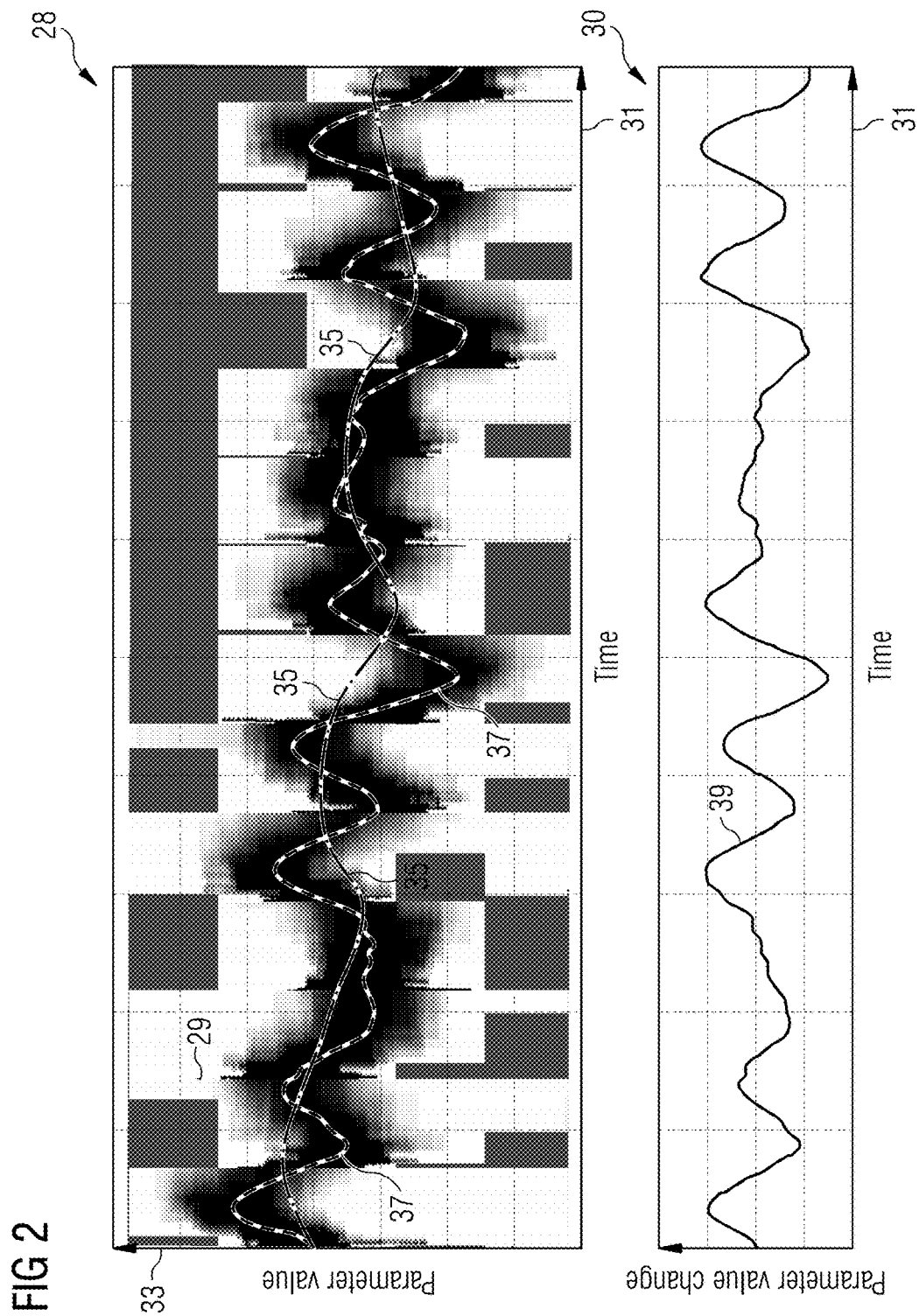
FIG. 2 illustrates a graph measurement data acquired during a method according to an embodiment of the present invention and a graph of a parameter value change as derived according to an embodiment of the present invention.

In graph 28 of FIG. 2, the plural samples 29 of the measured relative wind directions are indicated, wherein the abscissa 31 represents the time and the ordinate 33 represents the value of the measured angle. According to an embodiment of the present invention, the change in the wind direction can be expressed in many different ways. One possibility is illustrated in graph 30 of FIG. 2. In this embodiment, the raw data 29 are filtered with a low-pass filter with a high time constant, in order to obtain the curve 35 and are additionally filtered with a low-pass filter with a low time constant to obtain the curve 37 (see graph 28 in FIG. 2). Graph 30 in FIG. 2 illustrates the difference between the high time constant low-pass filter processed raw data 29 and the low time constant low-pass filter processed raw data 29 as a curve 39. This curve 39 represents an expression of the change of the measured relative wind direction. In other embodiments, the change of the measured relative wind directions is calculated in a different manner.

Figure 3:
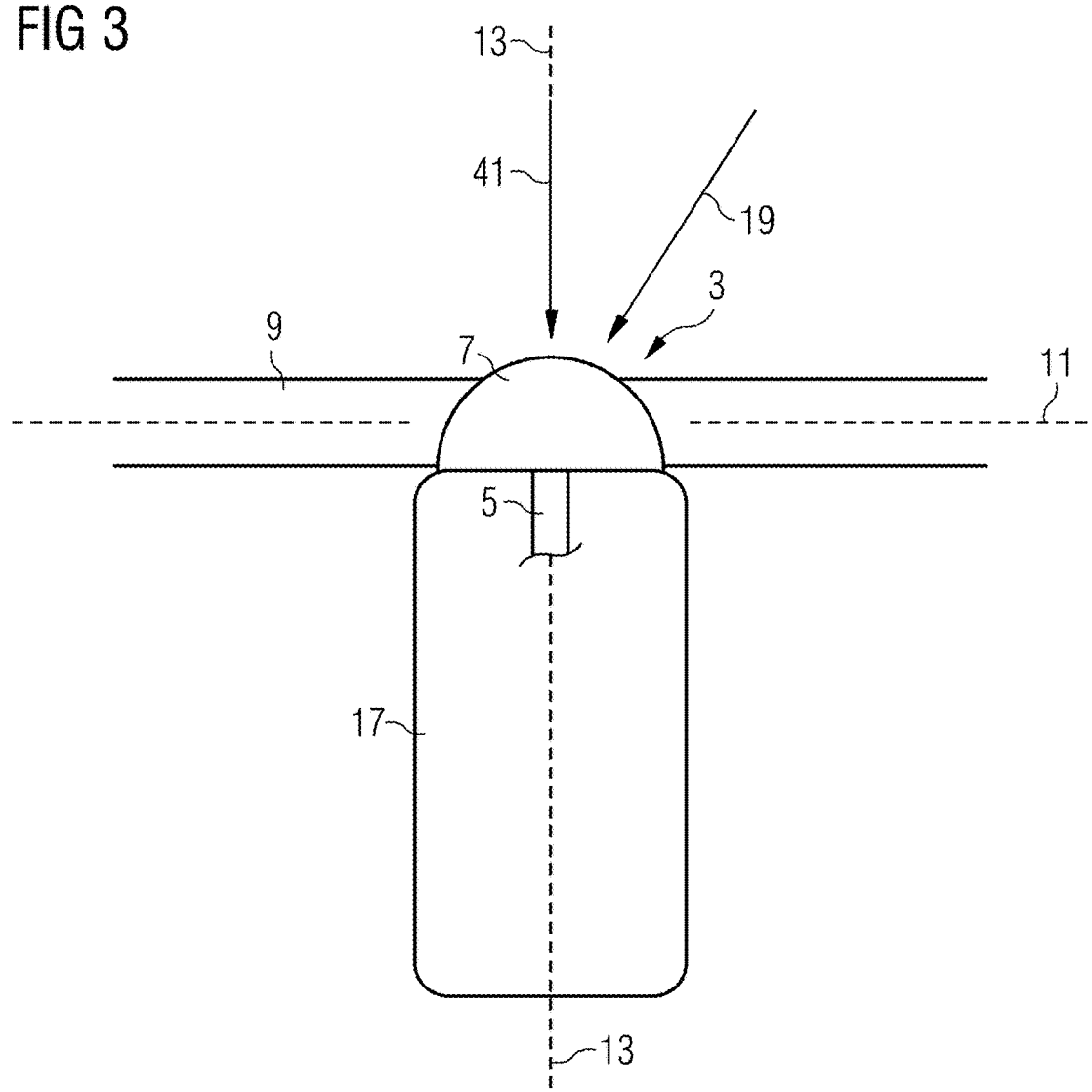
FIG. 3 illustrates in a schematic view of the effective wind vector as used as a performance parameter according to an embodiment of the present invention.

The method performed by the arrangement 3 further comprises to measure plural samples of a performance parameter indicating a performance of the wind turbine 1. The performance parameter may for example be the effective wind speed which will be explained with reference to FIG. 3. The effective wind vector 41 can be considered to be the component of the real wind direction 19 parallel to the nacelle direction 13 (corresponding to the rotor axis of the rotor shaft 5). The effective wind vector 41 may be calculated using a turbine model and taking into account actual power production, actual rotor speed and actual pitch angle. The plural samples of the performance parameter may then similarly be processed as the measured relative wind directions, as is explained with reference to FIG. 2, in order to derive a performance change based on the plural samples of the performance parameter.

The plural samples of the performance parameter are indicated as a signal 43 which is also supplied to the arrangement 3 (illustrated in FIG. 1) which receives the plural measured samples of the relative wind direction α'. In FIG. 1, the performance parameter 43 is estimated and output by a performance estimator 42.

The arrangement 3 is adapted to determine a correlation value between the measured relative wind direction change and the performance change. When further plural samples of the relative wind direction are measured, the arrangement 3 outputs the corrected further measured relative wind directions α" which are corrected based on the determined correlation value.

Figure 4:
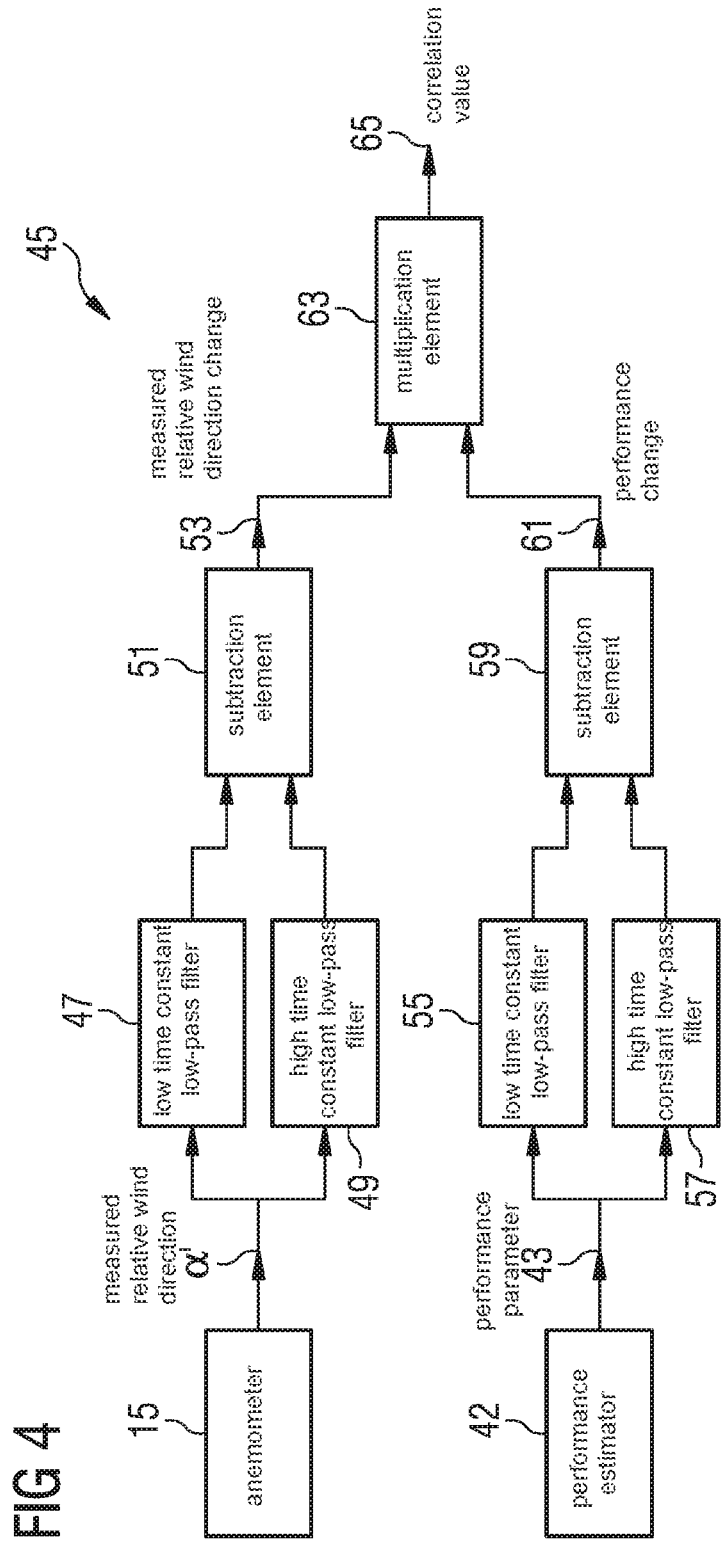
FIG. 4 illustrates a flow-chart of a method for calibrating/performing a wind direction measurement according to an embodiment of the present invention.

An example of an algorithm according to an embodiment of the present invention which is performed by the arrangement 3 is illustrated in FIG. 4 as a flow-chart 45. The nacelle anemometer 15 outputs the measured relative wind direction α'. The measured relative wind direction α' is supplied to a low time constant low-pass filter 47 and a high time constant low-pass filter 49. The outputs of the low time constant low-pass filter 47 and the high time constant low-pass filter 49 are subtracted in a subtraction element 51 to obtain the measured relative wind direction change 53.

The performance estimator 42 outputs as a performance parameter for example the effective wind speed 43 and supplies the effective wind speed to a low time constant low-pass filter 55 and in parallel to a high time constant low-pass filter 57. The outputs of the low time constant low-pass filter 55 and the high time constant low-pass filter 57 are supplied to a subtraction element 59 which outputs the performance change, in particular effective wind speed change 61.

Using a multiplication element 63, the measured relative wind direction change 53 and the performance change 61 are multiplied resulting in a correlation value 65 (in this application also referred to as wind direction modification gain). The correlation value 65, in particular wind direction modification gain, is utilized internally within the arrangement 3 in order to correct the measured relative wind directions and to output a corrected measured relative wind direction α". If the wind direction change and the effective wind speed change are multiplied, a value is obtained, that scales with the correlation between the wind direction change and the effective wind speed change. A correction value (or a scaled version thereof) derived from this value may be in particular subtracted from (or added to) the wind direction offset which over time will convert towards a setting where there is no correlation between wind direction changes and effective wind speed changes, i.e. the nacelle is facing the wind.

For a further improvement, the wind direction offset gain may be binned according to some sorting parameter, e.g. the wind speed. During this, one can obtain a wind direction calibration that takes the wind speed or another parameter into account.

Figure 5:
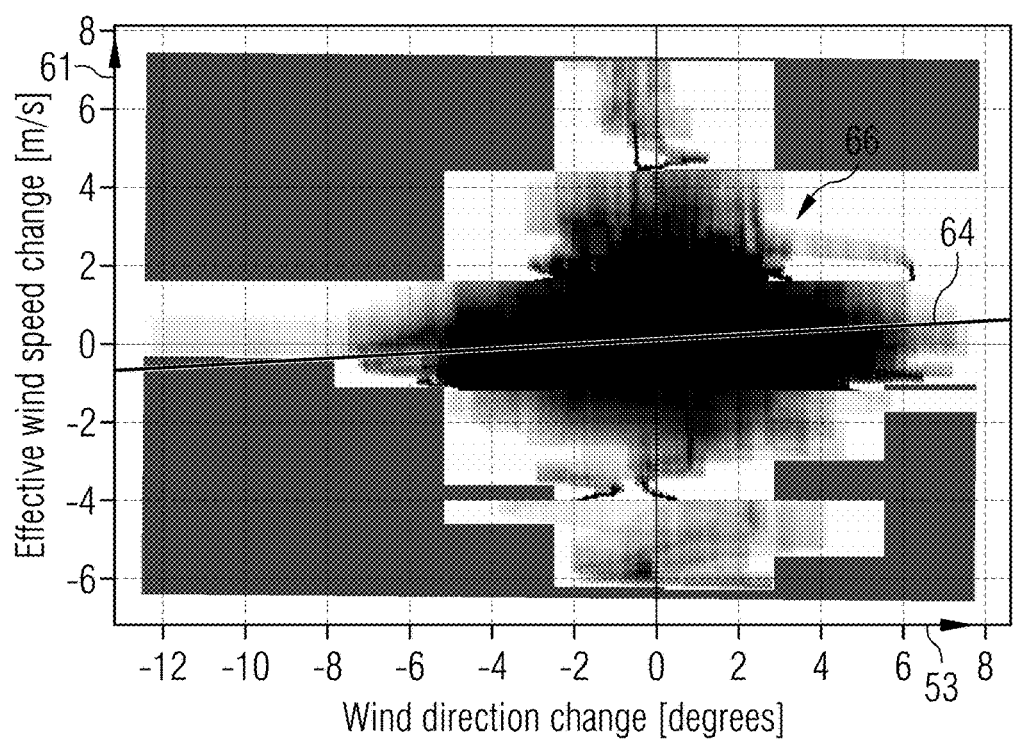
FIG. 5 illustrates a graph of measurement values or derived values relating wind direction change and effective wind speed change to each other.

FIG. 5 illustrates a relation between wind direction change and effective wind speed change using operational data from a wind turbine. In FIG. 5, the effective wind speed change is plotted against the wind direction change. The linear regression 64 on the data 66 reveals a trend where positive wind direction changes yields a higher effective wind speed.

Figure 6:
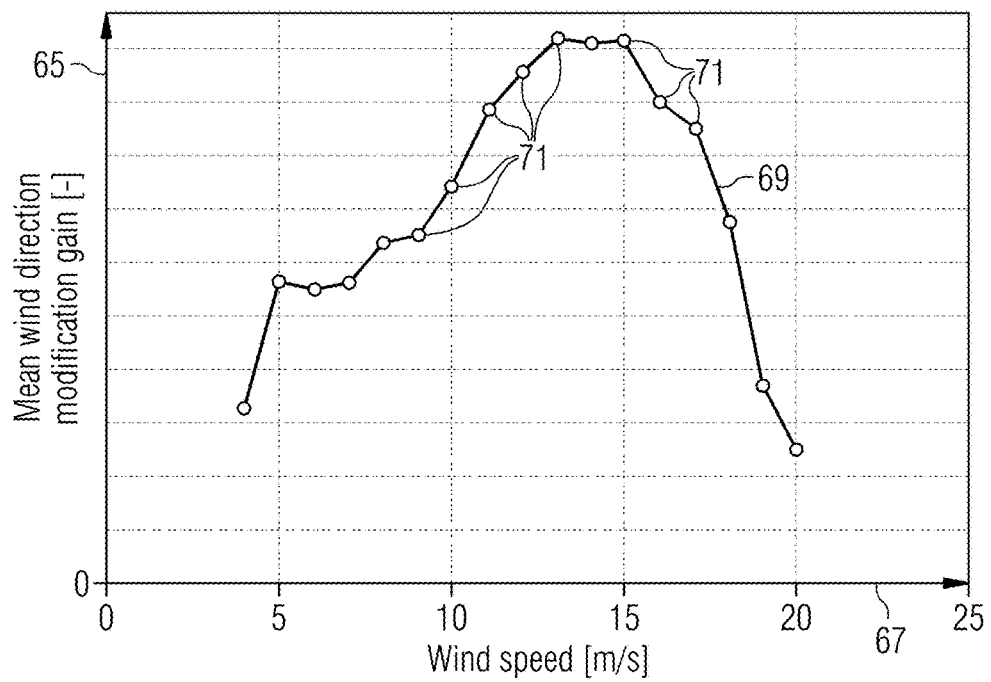
FIG. 6 illustrates a graph of the mean wind direction correlation value in relation to the wind speed according to an embodiment of the present invention.

FIG. 6 shows the mean wind modification gain (also called correlation value in the context of embodiments of the present invention, labelled with reference sign 65) as a function of wind speed indicated on the abscissa 67. The dependency is illustrated in a curve 69 connecting measurement points 71. As can be appreciated from FIG. 6, the correlation value between the measured relative wind direction change 53 and the performance change 61 depends on the wind speed.

According to an embodiment of the present invention, the measured relative wind direction α' output by the anemometer 15 may be corrected based on correlation values which depend on the wind speed 67. In other embodiments, a mean correlation value averaged over all reasonable wind speeds may be obtained and the measured relative wind directions may be corrected based on a single averaged correlation value.

According to embodiments of the present invention, the change in the wind direction and the change of some performance parameter are continuously expressed. Further, the correlation, or any other value related to the correlation, between changes in the wind direction and changes in the performance parameter are continuously estimated. Further, continuously, a small gain directly proportional the estimated correlation is subtracted from the wind direction as measured by the anemometer. Further, the wind direction measurement is modified with the wind direction modification derived from the correlation value. Embodiments of the present invention may increase the turbine power production significantly and/or may decrease turbine loads.

The change in the wind direction and the change in the performance parameter may be expressed in a number of ways. It is suggested to calculate the change based on the difference between the outputs of low-pass filters with different time constants. However, embodiments of the invention are not limited to the specific expression of change. Some other expression of the wind direction change and change in some performance parameter is possible.

As has been mentioned earlier, the performance parameter could comprise or be many different quantities. It is suggested to use the effective wind speed, but other quantities like produced power, rotor speed, pitch angle, or some quantity expression the turbine loads could also be used. In fact, any parameter related to the nacelle yaw position (relative to the wind direction) could potentially be used.

It is suggested to obtain the wind direction modification gain by multiplying the wind direction change and the change in the performance parameter. This operation may result in a scaled estimation of the correlation between the wind direction change and the change in the performance parameter. However, the wind direction modification gain could potentially be formed by any quantity related to the correlation between the wind direction change and the change in the performance parameter.

As has also be mentioned above, the wind direction modification may be a single number applied under all (wind) conditions at all time, but in other embodiments it could also be any kind of transfer function expression how the wind direction should be modified depending on one or more parameters, for example the wind speed.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be

The invention claimed is:

1. A method for performing a wind direction measurement for a wind turbine, the method comprising:
 measuring plural samples of a relative wind direction representing a difference angle between a real wind direction and an orientation of a measurement equipment, to obtain plural measured relative wind directions, wherein the orientation is a direction orthogonal to a rotor blade plane;
 deriving a measured relative wind direction change based on the measured relative wind directions;
 measuring plural samples of a performance parameter indicating a performance of the wind turbine;
 deriving a performance change based on the plural samples of the performance parameter;
 determining a correlation value between the measured relative wind direction change and the performance change including performing an operation that results in a scaled estimation of the correlation between the measured relative wind direction change and the change in the performance parameter, wherein the determining the correlation value between measured relative wind direction change and the performance change comprises multiplying the measured relative wind direction change and the performance change;
 measuring further plural samples of the relative wind direction; and
 correcting the further measured relative wind directions based on the correlation value, such that the correlation value approaches closer to zero;
 wherein an effective wind speed is estimated using a turbine model, taking into account at least one of actual power produced, actual rotor speed, and actual pitch angle and wherein the performance parameter comprises the effective wind speed.

2. The method according to claim 1, wherein the method is continuously, iteratively performed, during normal operation.

3. The method according to claim 1, wherein the method is performed irrespective whether at least one of the wind direction, a wind speed and a yaw position changes or not.

4. The method according to claim 1, wherein the performance parameter further comprises at least one of the following:
 a power, wherein the power is an active power, produced by the wind turbine, applied in low and medium wind ranges;
 a pitch angle, applied at high wind speed;
 an increase in rotor speed;
 a quantity being or being related to a load of at least one wind turbine component.

5. The method according to claim 1, wherein the deriving the measured wind direction change comprises:
 passing the plural measured samples of the relative wind direction through a low time constant low pass filter and a high time constant low pass filter and forming a difference of outputs of the two low pass filters.

6. The method according to claim 1, wherein the deriving the performance change comprises:
 passing the plural measured samples of the performance parameter through a low time constant low pass filter and a high time constant low pass filter and forming a difference of outputs of two low pass filters.

7. The method according to claim 1, wherein the correcting the measured relative wind direction based on the correlation value comprises:
 modifying the measured relative wind direction based on the correlation value such that a correlation between future modified measured relative wind direction and the future performance parameter decreases.

8. The method according to claim 1, wherein the correcting the measured relative wind direction based on the correlation value comprises:
 subtracting a value proportional to the correlation value from the measured relative wind direction.

9. The method according to claim 8, wherein
a proportionality factor is selected to avoid overshooting.

10. The method according to claim 1, further comprising:
 storing the determined correlation value, in dependence or association of at least one operational and environmental parameter, wherein the at least one operational and environmental parameter is a wind speed.

11. The method according to claim 10, further comprising:
 determining at least one operational and/or environmental parameter, wherein the at least one operational and/or environmental parameter is the wind speed; and
 subtracting a value proportional to the correlation value associated to the wind speed, to obtain the corrected measured relative wind direction.

12. The method according to claim 1, wherein the determining the correlation value between the measured relative wind direction change and the performance change includes determining a degree of mutual dependence of the measured relative wind direction change and the performance change.

13. The method according to claim 1, wherein the correlation value is positive if:
 the measured relative wind direction change is positive and also the performance change is positive; or
 the measured relative wind direction change is negative and the performance change is negative.

14. The method according to claim 1, wherein the correlation value is negative if:
 the measured relative wind direction change is negative and also the performance change is positive; or
 the measured relative wind direction change is positive and the performance change is negative.

15. The method according to claim 1, wherein the correlation value is a mean correlation value averaged over all reasonable wind speeds, the method further comprising correcting the further measured relative wind directions based on a single averaged correlation value.

16. A method for performing a wind direction measurement for a wind turbine, the method comprising:
 measuring plural samples of a relative wind direction representing a difference angle between a real wind direction and an orientation of a measurement equipment, to obtain plural measured relative wind directions, wherein the orientation is a direction orthogonal to a rotor blade plane;
 deriving a measured relative wind direction change based on the measured relative wind directions;
 measuring plural samples of a performance parameter indicating a performance of the wind turbine;
 deriving a performance change based on the plural samples of the performance parameter;
 determining a correlation value between the measured relative wind direction change and the performance change, wherein the correlation value is a mean correlation value averaged over all reasonable wind speeds;

measuring further plural samples of the relative wind direction; and correcting the measured relative wind directions based on a single averaged correlation value, such that the correlation value approaches closer to zero;

wherein an effective wind speed is estimated using a turbine model, taking into account at least one of actual power produced, actual rotor speed, and actual pitch angle and wherein the performance parameter comprises the effective wind speed.

17. A method for performing a wind direction measurement for a wind turbine, the method comprising:

measuring plural samples of a relative wind direction representing a difference angle between a real wind direction and an orientation of a measurement equipment, to obtain plural measured relative wind directions, wherein the orientation is a direction orthogonal to a rotor blade plane;

deriving a measured relative wind direction change based on the measured relative wind directions;

measuring plural samples of a performance parameter indicating a performance of the wind turbine;

deriving a performance change based on the plural samples of the performance parameter;

determining a correlation value between the measured relative wind direction change and the performance change including performing an operation that results in a scaled estimation of the correlation between the measured relative wind direction change and the change in the performance parameter, wherein the correlation value is a mean correlation value averaged over all reasonable wind speeds;

measuring further plural samples of the relative wind direction; and correcting the further measured relative wind directions based on the correlation value, such that the correlation value approaches closer to zero;

correcting the further measured relative wind directions based on a single averaged correlation value;

wherein an effective wind speed is estimated using a turbine model, taking into account at least one of actual power produced, actual rotor speed, and actual pitch angle and wherein the performance parameter comprises the effective wind speed.

* * * * *